United States Patent
Madsen et al.

[11] Patent Number: 6,056,003
[45] Date of Patent: May 2, 2000

[54] DOUBLE-SEATED VALVE

[75] Inventors: Karsten Schack Madsen, Kolding, Denmark; Paolo Benedetti, Modena, Italy

[73] Assignee: Tetra Laval Holdings & Finance S.A., Pully, Switzerland

[21] Appl. No.: 09/202,492
[22] PCT Filed: May 28, 1997
[86] PCT No.: PCT/EP97/02779
§ 371 Date: Dec. 16, 1998
§ 102(e) Date: Dec. 16, 1998
[87] PCT Pub. No.: WO98/54493
PCT Pub. Date: Dec. 3, 1998

[51] Int. Cl.[7] .............. F16K 11/04; F16K 11/20; B08B 9/06
[52] U.S. Cl. .............. 137/240; 137/241; 137/312; 137/614.18; 137/614.19; 251/331; 251/335.2
[58] Field of Search ................ 137/238, 240, 137/241, 312, 614.18, 614.19; 251/331, 335.2

[56] References Cited

U.S. PATENT DOCUMENTS

| | | | |
|---|---|---|---|
| 1,831,457 | 11/1931 | Larsen | 137/241 |
| 3,643,679 | 2/1972 | Hansson | 137/241 |
| 4,360,039 | 11/1982 | Jeppsson | 137/240 |
| 4,458,543 | 7/1984 | Mieth | 137/240 |
| 4,460,014 | 7/1984 | Mases et al. | 137/240 |
| 4,522,223 | 6/1985 | Balsys et al. | 137/240 |
| 4,605,035 | 8/1986 | Rasmussen et al. | 137/240 |
| 4,913,185 | 4/1990 | Mattei | 137/241 |
| 4,979,527 | 12/1990 | Mueller et al. | 137/240 |
| 5,085,241 | 2/1992 | Mieth | 137/240 |
| 5,904,173 | 5/1999 | Ozawa | 137/240 |

FOREIGN PATENT DOCUMENTS

| | | | |
|---|---|---|---|
| 4243111 | 6/1994 | Germany | 137/240 |

*Primary Examiner*—George L. Walton
*Attorney, Agent, or Firm*—Michael J. Striker

[57] ABSTRACT

The invention relates to a double-seat valve, particularly for aseptic applications, having at least two line connections (3, 4, 7), between which two annular valve seats (11, 12) are disposed coaxially with one another and in series, having two closers (8, 9), which are axially closable independently of one another and which in the closed state cooperate sealingly with the valve seats (11, 12) and between them enclose a hollow chamber (34), and having at least one cleaning connection (35, 36), discharging into the hollow chamber (34), for introducing a cleaning medium. To overcome the disadvantages of a fluidically unfavorable leakage hollow chamber, it is provided according to the invention that a one-piece, annularly encompassingly designed elastic sealing element (21) is secured sealingly in each case by its two end portions (22, 23) to the two closers (8, 9), with one sealing face (25, 26) embodied adjacent to each end portion (22, 23), the sealing face being pressable by a closer (8, 9) against the associated valve seat (11, 12), and that the sealing element (21) has a roller diaphragm portion (24), which connects the two end portions (22, 23) to one another and defines the hollow chamber (34).

19 Claims, 4 Drawing Sheets

DOUBLE-SEATED VALVE

The invention relates to a double-seat valve, particularly for aseptic applications, having at least two line connections, between which two annular valve seats are disposed coaxially with one another and in series, having two closers, which are axially closable independently of one another and which in the closed state cooperate sealingly with the valve seats and between them enclose a hollow chamber, and having at least one cleaning connection, discharging into the hollow chamber, for introducing a cleaning medium.

Double-seat valves are used particularly in food processing for making sterile products, such as milk products. A leakage hollow chamber between the two closing elements receives any leakage that might occur and the leakage can then be diverted via a special line connection opening into the leakage hollow chamber. To maintain or restore the sterility of the valve under all circumstances, the leakage hollow chamber must be capable of being effectively cleaned and sterilized.

In a double-seat valve, this cleaning can either by done by passing a cleaning fluid or hot steam through the leakage hollow chamber in a state in which it is closed on both sides to which end inflow and outflow lines with additional shutoff valves are provided, opening particularly into the leakage space; or alternatively, one of the two closing elements of the double-seat valve is "vented", to allow the cleaning medium flowing in through the inflow line to flow past it, so that the applicable valve seat is also cleaned or sterilized. A double-seat valve as defined generically by the preamble to claim 1 is known for instance from German Patent Disclosure DE 42 43 111 A1. As its closing elements, the known double-seat valve has two valve plates, which are axially displaceable and can be pressed against two valve seats by means of two shafts nest in telescoping fashion in one another. The valve seats are disposed at a relatively great axial spacing from one another, so that the two valve plates in the closed state between them enclose a relatively large leakage hollow chamber.

Because of the large interior surfaces, it is difficult on the one hand to keep such large leakage hollow chambers sterile. If hot steam is used, on the other hand, the valve plates or even the entire valve housing can heat up to such an extent that chemical changes occur in the substances, such as milk products, located in the adjacent hollow chamber behind the valve plate. This disadvantageous influence on the nature of the substances to be processed is something that must be avoided under all circumstances.

The known double-seat valve has the further disadvantage that the lower valve plate, even in the open state, is always located inside the leakage hollow chamber. The substances to be processed must change their flow direction repeatedly on passing through the leakage hollow chamber, because of the labyrinthine construction. If these substances are for instance intended to pass from the upper pipe neck to the lower one, then they are first deflected radially inward between the upper valve plate and the associated valve seat and then have to flow axially downward and finally emerge radially to the outside again at the lower valve plate. After another short distance axially downward, they are pressed radially inward again between the lower valve plate and the associated valve seat, until they can finally leave the leakage hollow chamber axially at the bottom. It is immediately apparent that these conditions are not optimal on fluidic grounds.

In addition, the short distances between the valve plates and the walls of the leakage hollow chamber or the valve seats limit the maximum size of particles that may be contained in the substance to be processed. For instance, this can set a limit on processing fruit yogurt with whole fruit.

The object of the invention is to disclose a double-seat valve whose construction allows an improved design of the hollow chamber, so that the substance to be processed can pass through in a fluidically favorable way even if it contains relatively large particles.

According to the invention, this object is attained in that a one-piece, annularly encompassingly designed elastic sealing element is secured sealingly in each case by its two end portions to the two closers, with one sealing face embodied adjacent to each end portion, the sealing face being pressable by a closer against the associated valve seat, and that the sealing element has a roller diaphragm portion, which connects the two end portions to one another and defines the hollow chamber.

The double-seat valve of the invention has the advantage first that a single sealing element performs three functions. On the one hand, it seals off the two closers from the two valve seats, and on the other, it takes on the function of a sealed, flexible connection between the two closers, by means of which the hollow chamber is defined and separated from the interior of the closers.

This last function is performed in the known double-seat valve by a metal bellows, which can assure the requisite axial relative motion of the two valve plates only at the cost of a great axial length. The attendant major axial spacing of the two valve plates is one reason for the disadvantageous size of the leakage hollow chamber.

The construction according to the invention makes the voluminous bellows dispensible. As a result, the two valve seats can be close together axially, so that the hollow chamber located between them is reduced considerably in size. Upon sterilization with hot steam, because the surface area exposed to the steam can been reduced greatly, the other regions of the valve are not heated excessively even under long subjection to the steam. The relative motion of the two closers is assured by the roller diaphragm portion of the sealing element.

In a preferred embodiment of the invention, it is provided that a first closer has a jacket part, whose end is widened in beaker-like fashion into a collar portion, and that a second closer has a head part, which is disposed radially inside the collar portion.

As a result of this provision, the two closers form an especially compact unit, which allows the two valve seats to be placed extremely close together and enables further reduction in the size of the hollow chamber.

The provision that the first closer has a beaker-shaped cup part, which is disposed coaxially in the collar portion of the jacket part, and that a first end portion of the sealing element is sealingly clamped between an encompassing edge of the jacket part and an encompassing edge of the cup part, assures simple, tight fastening of the sealing element.

A simple and advantageous feature of the sealing function of the first closer provides that the encompassing edge of the cup part protrudes axially relative to the edge of the jacket part, and that a first encompassing sealing face of the sealing element is disposed in the region of the protruding edge, so that the sealing face can be pressed axially by this edge against a first valve seat. The sealing face, because it is disposed radially on the inside, is advantageously moved as far as possible into the vicinity of the other closer, so that the hollow chamber can be reduced still further in size.

An advantageously compact form of the second closer with "gentle" surface contours that present little resistance to the substances flowing past them is obtained by the combination of characteristics that the second closer has a cap part, disposed coaxially on the head part, which has a radial extent less than that of the head part, and that a second end portion of the sealing element is sealingly clamped between an encompassing edge of the head part and an encompassing edge of the cap part.

An advantageous feature of the second sealing seat provides that a second encompassing sealing face of the sealing element is disposed radially outside the cap part in the region of an encompassing protrusion of the head part, so that this sealing face can be pressed axially by the head part against a second valve seat. By this provision, the second sealing face is moved as far as possible into the vicinity of the first closer.

By the provision that the encompassing protrusions and the second sealing face are inclined relative to the valve axis, preferably by an angle in the range of approximately 45°, the outer contour of the second closer around which the substances to be processed flow can be made even "gentler".

In a further feature of the invention, it is provided that the head part of the second closer has an encompassing channel of U-shaped profile, in which the roller diaphragm portion of the sealing element is received. This provision on the one hand assures optimal protection of the rolling diaphragm and on the other enables a further reduction in the size of the leakage hollow chamber.

The walls of the valve housing facing the channel can now be embodied smoothly, which has advantageous for flow conditions. The hollow chamber embodied according to the invention is no longer formed by an outward bulge of the valve housing, as the known leakage hollow chamber is. It is displaced into the second closer and now comprises only the annular hollow chamber, which on one side is defined by the smooth housing wall and on the other side by the roller diaphragm portion of the sealing element. If, with the valve open, the unit comprising the two closers is raised upward from the housing wall, nothing having the nature of a hollow chamber remains behind on the housing wall. The maximum width of the free through opening, which also defines the maximum particle size that can pass through is determined solely by the size of the axial stroke of the unit comprising the two closers.

To avoid damage to the sealing element in operation of the valve, it is provided that a mutual rotation of the two closers is prevented by at least one axially disposed pin, which is rigidly secured to one closer and is disposed axially slidingly in an opening of the other closer.

In a further feature of the double-seat valve, it is provided that the collar portion of the jacket part of the first closer changes over into a narrowed neck portion, which is secured to a flexible diaphragm that extends substantially radially away from the neck portion and both seals off the closer from the valve housing and assures its axial mobility. By means of this construction, the axial mobility of the unit comprising the two closers, which is required for fully opening the valve, is assured, and the disadvantages of a bellows used in the known double-seat valve—that is, a great axial length and a large surface area that is hard to clean—are avoided. The double-seat valve according to the invention, because fewer demands of axial height are made, can have a shallower and less voluminous housing, which is advantageously compact and more economically made and is easier to clean.

In a feature of the actuating device, an actuating rod disposed concentrically, radially inside the first closer, is secured to the second closer and is connected by its other end to a pneumatic actuating device. By this provision for actuating the second closer, the need to lead actuating elements through into the sterile interior of the valve housing, with the attendant sealing problems, is averted.

If the surface areas of the diaphragm and the first closer that are effective with respect to the pressure in the passageway region are substantially equal, then the valve assembly is essentially balanced hydraulically, so that any pressure changes in the passageway region that may occur cannot cause "venting" of the first valve seat. This makes the valve assembly invulnerable to pressure surges in the processing system.

The provision that the actuating device has a further piston-cylinder unit, which acts on the end of the jacket part of the first closer located outside the diaphragm and permits venting of the first valve seat while the second valve seat is closed, enables a communication between the hollow chamber and the passageway region for cleaning and disinfecting purposes.

In a feature of the invention, a spring is operatively disposed between the second closer and the first closer, by which spring, when the second closer is pressed against the second valve seat, a contact pressure is exerted on the first closer against the first valve seat. As a result, in a simple way a more-secure closure of both valve seats is attained if only one closer, namely the second, is pressed against a valve seat. To close both valve seats, only a actuating device for one closer is then needed. Any further actuating rod that might otherwise be needed to actuate the first closer can advantageously be dispensed with.

Disposing the aforementioned spring in the interior of the first closer has the advantage that a compact cylindrical structure is obtained, in which the spring cannot come into contact with the aseptic substance in the passageway region of the valve, since after all the interior of the closer is sealed off from the passageway region by the sealing element disposed between the closers.

If the second closer can be vented by raising the actuating rod, while the cup spring keeps the first closer pressed against the first valve seat, then additional actuating means for venting the first closer can be dispensed with.

If two cleaning connections, which are closable with two cleaning valves discharge into the hollow chamber, then the leakage hollow chamber can have cleaning medium flowing through it even if the valve seats are completely closed.

By the provision that the valve seats of the cleaning valves are disposed in the immediately vicinity of the orifices into the hollow chamber, the volume of the leakage hollow chamber is reduced and the contour of the inner wall of the valve housing is smoothed still further.

Further advantages and details of the invention will become apparent from the ensuing description of an exemplary embodiment in conjunction with the drawings.

Figure 1:
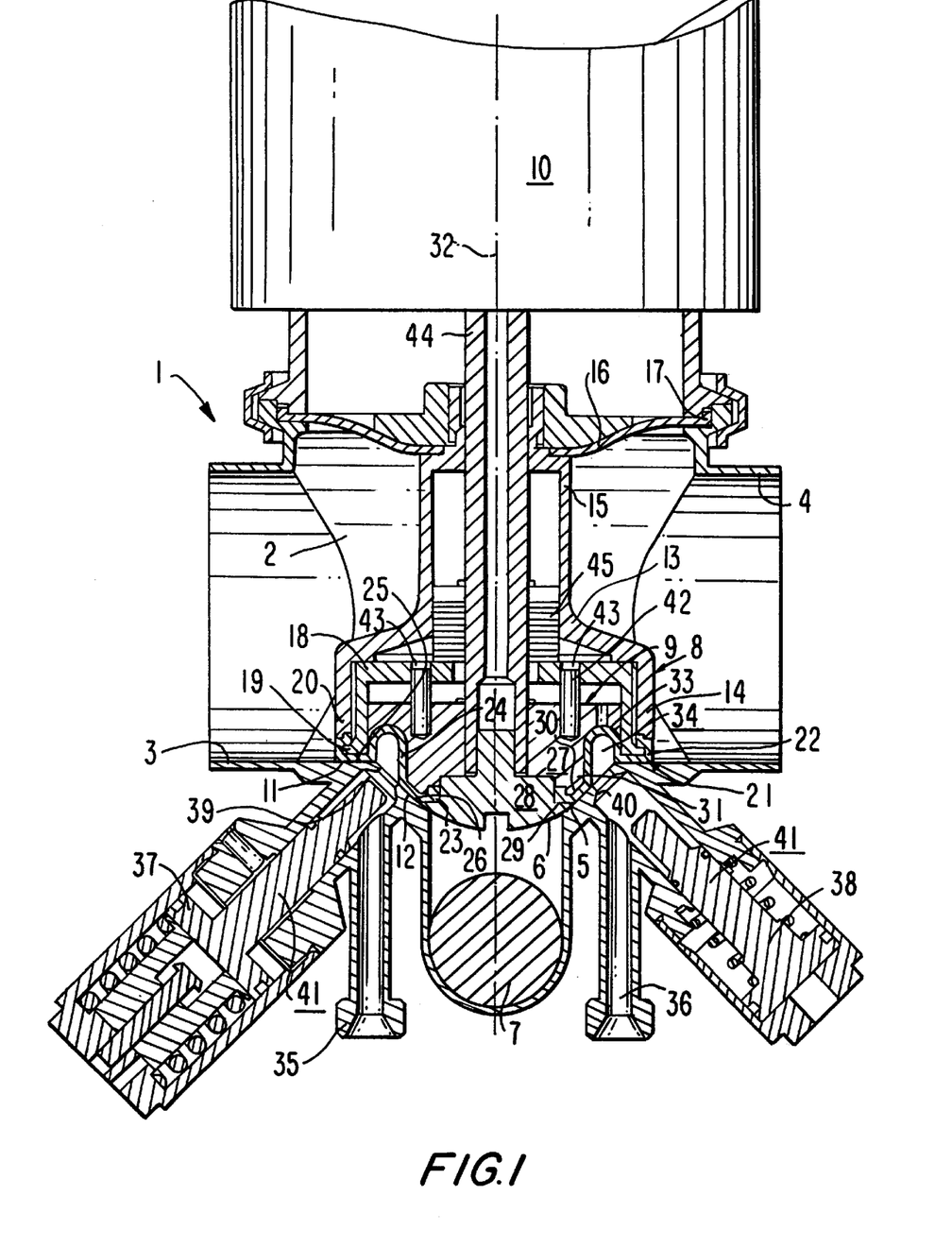
FIG. 1, a sectional view of a double-seat valve of the invention in the completely closed state.
Figure 2:
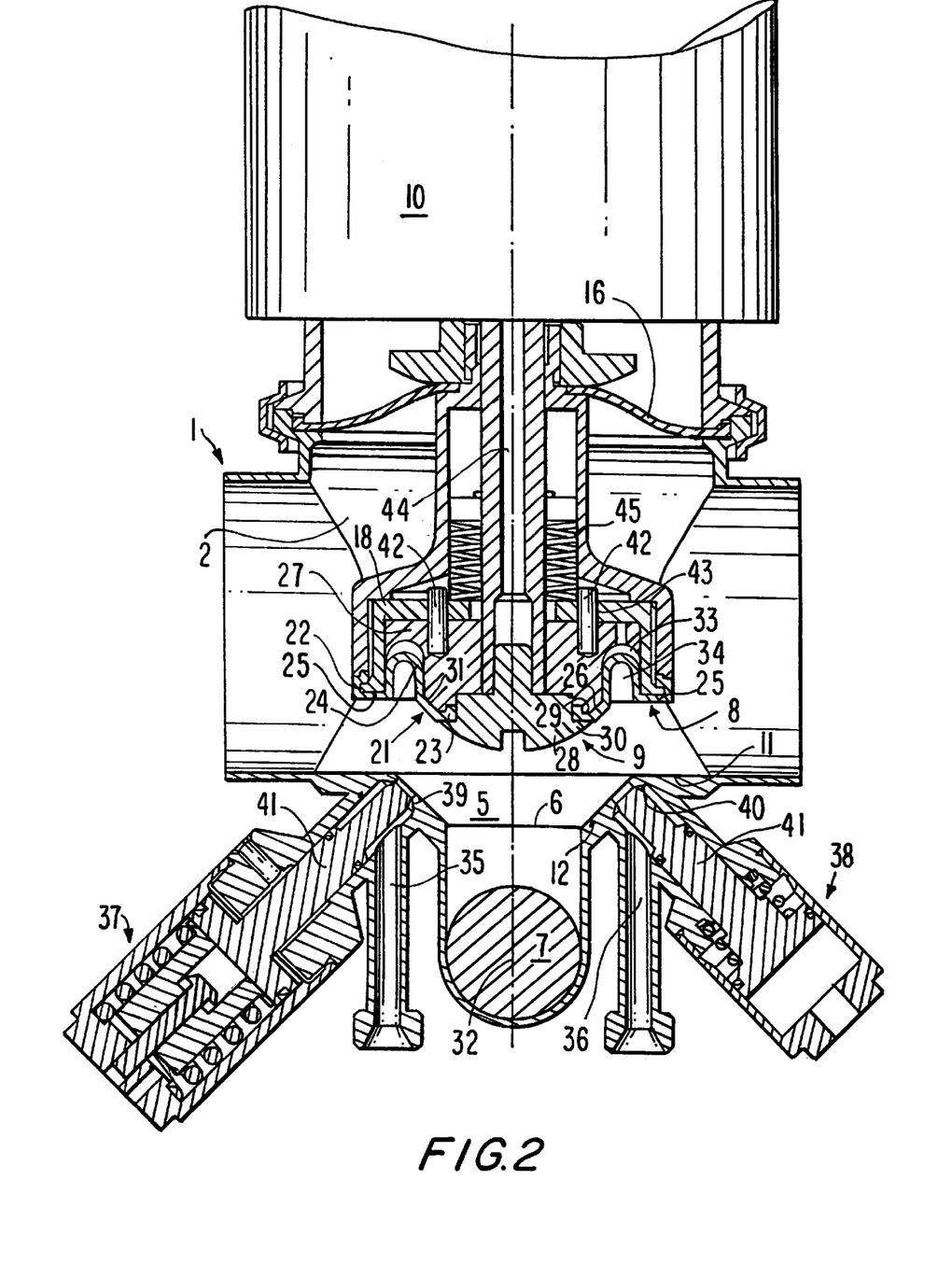
FIG. 2, the valve of FIG. 1 in the completely open state.
Figure 3:
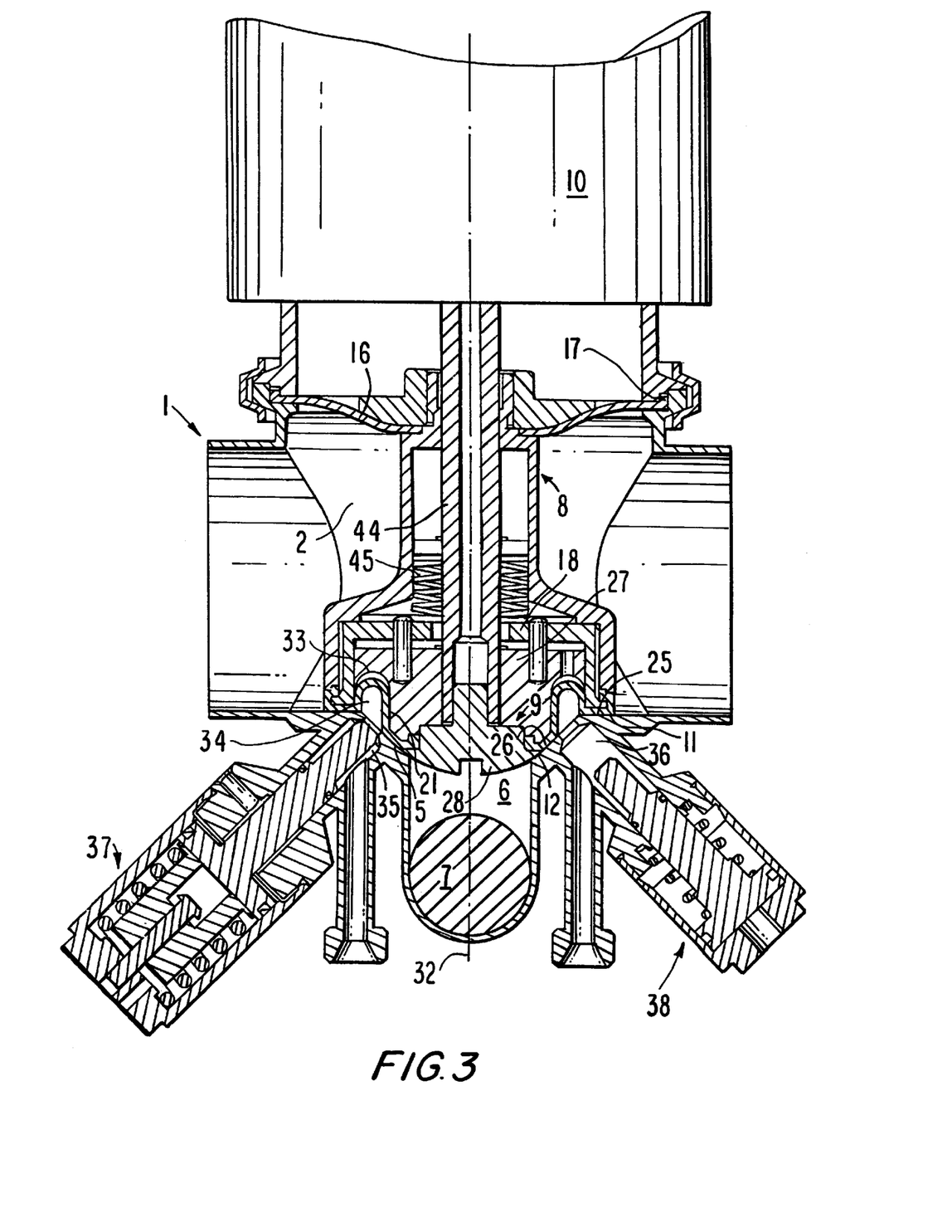
FIG. 3, the valve of FIG. 2 in the partly open state, in which the second closer is "vented"

The double-seat valve shown in FIGS. 1–3 has a valve housing 1 with a central nonclosable passageway region 2, intended for the flow through it of a substance, which region changes over into two oppositely disposed pipeline necks 3, 4. At the bottom, the passageway region 2 is adjoined by a conical outward bulge 5, which via a large central opening 6 opens into a branch line 7.

An axially displaceable closing unit comprising two closers 8, 9 is accommodated in the passageway region 2 and when the valve is closed protrudes into the bulge 5 and closes the opening 6, so that the branch line 7 is disconnected from the passageway region 2. The closers 8, 9 may be axially raised or lowered, independently of one another to a certain extent, by a pneumatic actuating device 10 mounted on the valve housing 1.

A first annular valve seat 11 that tightly surrounds the upper edge of the bulge 5 is formed in an upper bottom portion of the passageway region 2. A second valve seat 12, which surrounds the edge of the opening 6, is formed in the conical bulge 5. With respect to the flow direction from the passageway region 2 to the branch line 8 or vice versa, the two coaxial valve seats 11, 12 are disposed one after the other in series. The first closer 8 cooperates sealingly with the first valve seat 11, and the second closer 9 cooperates sealingly with the second valve seat 12.

The first closer 8 has a jacket part 13, which comprises a collar portion 14, widened in beaker-like fashion, and a narrowed neck portion 15, which merge with one another. The neck portion 15 is joined on its upper end to a flexible diaphragm 16, which extends radially outward beginning at the neck portion 15 and is solidly joined by its outer edge 17 to the valve housing 1. Because of its relatively great radial width, the diaphragm 16 assures a long axial stroke of the first closer 8.

A cup part 18, which is screwed coaxially into the widened collar portion 14 of the jacket part 13, also belongs to the first closer 8. An encompassing edge 19 of the cup part 18, pointing downward in the drawings, is bent outward radially toward the adjacent encompassing edge 20 of the collar portion 14 and protrudes axially somewhat past it, so that a gap is created between the edges 19, 20. An encompassing end portion 22 of a sealing element 21 is clamped in this gap.

The one-piece sealing element 21 has a profile, which can be seen in the drawings, that is designed to extend annularly all the way around and comprises rubber. Along with the first end portion 22, the sealing element 21 also has a second end portion 23 and a roller diaphragm portion 24 joining the two end portions 22, 23. A first sealing face 25 is formed on the first end portion 22, in the region of the radially outwardly bent edge 19 of the cup part 18, and this sealing face can be pressed against the first valve seat 11 by the edge 19 upon actuation of the first closer 8.

The second closer 9 has a head part 27, which is disposed radially inside the cup part 18 of the first closer 8 and axially displaceable relative thereto. The second closer 9 also has a cap part 28, which is disposed coaxially on the head part 27 and is joined to it. The cap part 28 has a lesser radial extent than the head part 27 and protrudes axially (downward in the drawings) past the head part 27 with a substantially spherical domelike portion. Between an encompassing edge 30 of this portion of the head part 27 and an edge 29 of the cap part 27, a gap is formed in which the second end portion 23 of the sealing element 21 is clamped.

Directly adjacent the aforementioned gap and radially outside the cap part 28, an encompassing protrusion 31 is formed on the head part 27, the protrusion being beveled by approximately 45° from the valve axis 32. In the region of this protrusion 31, a second encompassing sealing face 26 is formed on the sealing element 21; upon actuation of the second closer 9, this sealing face is pressed by the protrusion 31 against the second valve seat 12.

The head part 27 of the second closer 9 has an encompassing channel 33 of U-shaped profile, in which the roller diaphragm portion 24 of the sealing element 21 is accommodated.

In the completely closed state of the double-seat valve, the two sealing faces 25, 26 of the sealing element 21 are pressed firmly by the two closers 8, 9 against the two valve seats 11, 12 (FIG. 1). Between the two valve seats 11, 12, this partitions off a hollow chamber 34 (on one side of the passageway region 2 and on the other side of the branch line 7). In the lower region, the hollow chamber 34 is defined by the conical wall of the bulge 5, and in the upper region by the roller diaphragm portion 24 of the sealing element 21. Its volume and its internal surfaces are thereby reduced to a minimum.

Discharging into the hollow chamber 34 are two cleaning connections 35, 36, which are closable by means of two cleaning valves 37, 38. The cleaning valves 37, 38 have valve seats 39, 40, which are disposed in the immediate vicinity of the orifice into the hollow chamber 34. When the cleaning valve 37, 38 is closed (FIG. 2), a valve closure 41 is pressed against the valve seat 39, 40, so that only a negligibly small hollow chamber now remains between the valve closure 41 and the conical inner wall of the hollow chamber 34, and this hollow chamber contributes hardly at all to the total volume and total inside surface area of the hollow chamber 34.

To prevent relative rotation of the two closers 8, 9, two pins 42 are secured to the head part 27 of the second closer 9 and axially slidingly engage two openings 43 of the cup part 18 of the first closer 8. This does not impair the relative axial displaceability of the closers 8, 9.

The pneumatic actuating device 10 includes a bidirectional pneumatic piston-cylinder unit, not shown in the drawings, which acts upon an actuating rod 44 disposed concentrically and radially inside the first closer 8 and can displace this rod upward or downward in both axial directions. The actuating rod 44 is solidly joined to the second closer 9 and acts elastically upon the first closer 8 as well, via a cup spring assembly, hereinafter called simply a cup spring 45 for short.

The cup spring 45 is disposed in the interior of the first closer 8. As a result, on the one hand a compact cylindrical structure is obtained, and on the other the advantage is attained that the cup spring 45 cannot come into contact with the aseptic substance in the passageway region 2, since after all the interior of the closer 8 is sealed off from the passageway region 2 by the sealing element 21 disposed between the two closers 8, 9. Thus problems with cleaning and disinfection of the fissured cup spring 45 cannot even arise.

In the completely closed position of both valve seats 11, 12 as shown in FIG. 1, the actuating rod 44 presses axially downward. It thus acts directly on the second closer 9, which accordingly also presses downward and in so doing presses the second sealing face 26 of the sealing element 21 firmly into the second valve seat 12. The actuating rod 44 also presses axially from above onto the cup spring 45, however, which is prestressed in this position and therefore transmits the axial force from its lower end to the cup part 18 of the first closer 8. The cup part 18 thereupon in turn presses the first sealing face 25 of the sealing element 21 against the first valve seat 11. Thus both valve seats 11, 12 are firmly closed, even though only the second closer 9 is actuated. For closing both valve seats 11, 12, only a single actuating device with a single actuating rod 44 is needed.

The hollow chamber 34 can be cleaned or disinfected in this valve position without the cleaning medium reaching the adjoining passageway region 2 or the branch line 7. The adjoining regions can also remain filled, during the cleaning process, with the sterile substance to be processed without this substance coming into contact with the cleaning medium.

For cleaning, the two cleaning valves 37, 38 are then opened and the hollow chamber 34 is flushed, for instance with hot steam, which enters at one cleaning connection 35 and leaves at the other cleaning connection 36. Because of the extremely small interior surface area of the hollow chamber 34, overheating of the valve housing 1 need not be expected, even if this steam is left to act for a relatively long time.

In order to open the second valve seat 12 slightly ("venting") as shown in FIG. 3, the actuating rod 44 is drawn axially upward by the actuating device 10. It then acts directly on the second closer 9, which it pulls along with it upward. In the process, however, the cup spring 45 still presses downward against the cup part 18, which therefore initially does not also execute the axial upward motion, as a consequence, the second closer 9 slides axially upward relative to the fixed first slide 8, until the top of the head part 27 strikes the cup part 18. If the actuating rod 44 remains in this position and does not move onward, then only the second valve seat 12 is slightly opened. The first valve seat 11 remains closed. The first sealing face 25 of the sealing element 21 continues to be pressed against the first valve seat 11 by the remaining force of the cup spring 45.

In this valve position, one or both cleaning valves 37, 38 can be opened, and along with the hollow chamber the second valve seat 12 and the second sealing face 26 can also be cleaned and disinfected. In this process, the cleaning medium does not enter the passageway region 2 partitioned off by the first valve seat 11, and thus region can continue to be filled with the substance to processed.

In order to open the two valve seats 11, 12 completely, as shown in FIG. 2, the actuating rod 44 is first raised, as described above, then moved axially onward past the position shown in FIG. 3. Because of the contact of the head part 27 of the second closer 9 with the cup part 18 of the first closer 8, the latter is also pulled upward upon further axial displacement of the actuating rod 44, so that the first valve seat 11 opens as well.

The axial motion of the unit comprising the two closers 8, 9 is limited at the top only by the range of elasticity of the diaphragm 16. Because of the only slight axial length of the bulge 5 and of the second closer 9 to be introduced into it, however, a relatively wide passage for the substance to be processed already opens at a relatively short axial stroke of the aforementioned unit, so that even larger particles contained in it do not present any problems.

The substantially flowing contours of the bulge 5 and of the underside of the closing unit also promote an unhindered, smooth flow past them. Advantageously, the substance to be processed need not cross any leakage hollow chamber, because on the basis of the invention, upon complete opening of the valve, such an leakage hollow chamber is automatically removed from the passageway region and therefore "no longer exists" as far as the substance flowing past is concerned.

Opening only the first valve seat 11 while the second valve seat 12 is closed is not contemplated in the exemplary embodiment shown in the drawings. However, it is understood that a double-seat valve according to the invention may also be equipped with this actuation variant. For instance, the construction shown could be simply modified by adding a further pneumatic piston-cylinder unit to the actuating device 10, this further unit then acting on the end, located outside the diaphragm 16 of the jacket part 13 of the first closer 8. If the disposition of the cup spring 45 were also modified slightly, so that from the position shown in FIG. 1 it could be compressed even further, then the first closer 8 could be "vented" by means of the further pneumatic piston-cylinder unit out of the first valve seat 11, with the actuating rod 44 at the same time keeping the second closer 9 pressed against the second valve seat 12.

"Venting" of the first closer 8 from the first valve seat 11 can also, however, be attained by generating a pressure difference between the passageway region 2 located on the inside of the diaphragm 16 and the space in the actuating device 10 located on the outside of the diaphragm 16. In that case, the first closer 8 could also execute a stroke, independently of the second closer 9. No additional mechanical means on the first closer 8 itself are needed for the purpose. The pneumatic actuating device 10 need merely be modified such that it can generate the aforementioned pressure difference. To that end, in particular a pressure reduction in the space located on the outside of the diaphragm 16 may be considered.

The effective surface area of the diaphragm 16 with regard to the pressure in the passageway region 2 differs only insignificantly from the hydraulically effective surface area of the first closer 8, which is determined by the first valve seat 11. As a result, the valve assembly becomes relatively invulnerable to pressure surges in the process system. For instance, if major pressure changes occur in the passageway region, then the hydraulic pressure on the one hand acts directly on the first closer 8, which would thereby be pressed downward against its valve seat 11. On the other, however, the hydraulic pressure also acts on the diaphragm 16, which is pressed upward in the process and consequently pulls the first closer 8, solidly joined to it, upward as well. If the aforementioned effective surfaces areas do not differ too greatly from one another, then the upwardly and downwardly oriented forces approximately cancel one another out, so that there is no need to fear that the first closer 8 will be raised away from the first valve seat 11.

Figure 4:
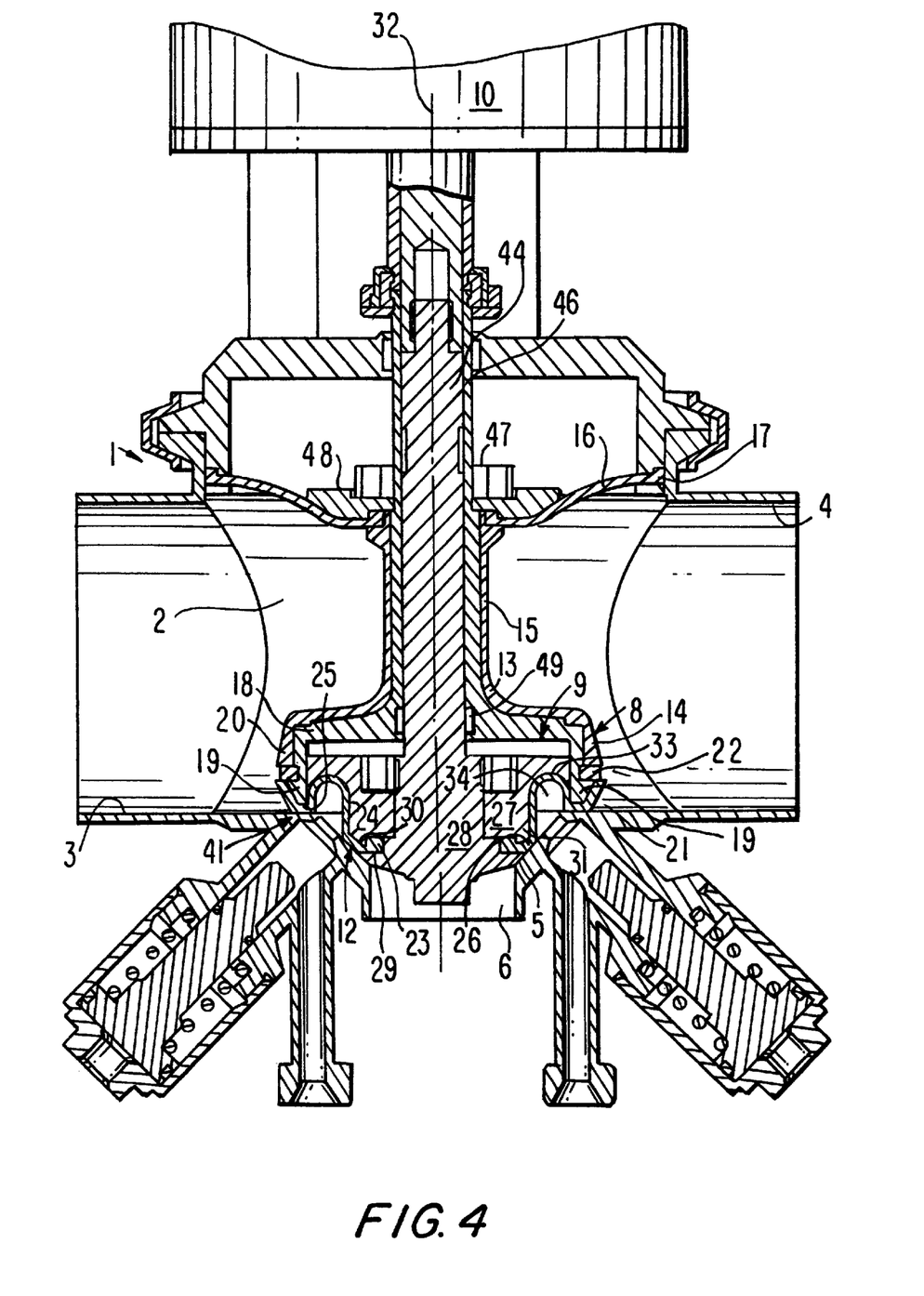
FIG. 4, a sectional view of another embodiment of the valve of the invention in the closed state.

The embodiment of the valve of the invention as shown in FIG. 4 differs from the form described in conjunction with FIGS. 1–3 substantially in that the first closer 8 can also execute a partial stroke for cleaning the first valve seat 11. To that end, the cup spring 45 (FIGS. 1–3) has been dispensed with, and a second actuating rod 46 has been extended to the outside into the pneumatic actuating device 10. The actuating rod 44 is solidly joined to the cup part 18 and in telescoping fashion passes through the second actuating rod 46. As needed, the cup spring 45 can then be provided in the actuating device 10, for instance as described in German Patent DE-C 195 48 860. The two actuating rods 44 and 46 thus permit partial strokes, for cleaning the seat faces, that can be performed separately from one another.

The diaphragm 16 is fastened by means of the nut 47 between the plate 48 and the upper end face of the neck portion 15. To that end, the actuating rod 46 has a corresponding portion with a mail thread.

The head part 27 is braced against the cap part 28 with the aid of a nut 49. To that end, a corresponding male thread portion is provided on the cap part 28. For engagement by a suitable clamping tool for tightening the nut 49, this nut has bores 50.

List of Reference Numerals

1 Valve housing
2 Pipeline neck
4 Pipeline neck
5 Outward bulge
6 Opening
7 Branch line
8 First closer 9 Second closer
10 Actuating device
11 First valve seat
12 Second valve seat
13 Jacket part
14 Collar portion
15 Neck portion
16 Diaphragm
17 Edge
18 Cup part
19 Edge
20 Edge
21 sealing element
22 First end portion
23 Second end portion
24 Roller diaphragm portion
25 First sealing face
26 Second sealing face
27 head part
28 cap part
29 Edge
30 Edge
31 Protrusion
32 Valve axis
33 Channel
34 hollow chamber
35 Cleaning connection
36 Cleaning connection
37 Cleaning valve
38 Cleaning valve
39 Valve seat
40 Valve seat
41 Valve closure
42 Pin
43 opening
44 Actuating rod
45 Cup spring
46 Second actuating rod
47 Nut
48 Plate
49 Nut
50 Bores

What is claimed is:

1. A double-seat valve, particularly for aseptic applications, having at least two line connections (3, 4, 7), between which two annular valve seats (11, 12) are disposed coaxially with one another and in series, having two valve closers (8, 9), which are axially closable independently of one another and which in the closed state cooperate sealingly with the valve seats (11, 12) and between them is an enclosed hollow chamber (34), and having at least one cleaning connection (35, 36), discharging into the hollow chamber (34), for introducing a cleaning medium therein, characterized in that a one-piece, annularly encompassingly designed elastic sealing element (21) is secured sealingly in each case by its two end portions (22, 23) to the two closers (8, 9), with a sealing face (25, 26) embodied adjacent to each end portion (22, 23), each sealing face being pressable by said closers (8, 9) against its associated valve seat (11, 12), and that the sealing element (21) has a roller diaphragm portion (24), which connects the two end portions (22, 23) to one another for sealing along said valve seats (11,12) at said end portions (22,23) and defining the hollow chamber (34) to clean along said said valve seats (11,12) between said end portions (22,23).

2. The double-seat valve of claim 1, characterized in that a first closer (8) has a jacket part (13), whose end is widened in beaker-like fashion into a collar portion (14), and that a second closer (9) has a head part (27), which is disposed radially inside the collar portion (14).

3. The double-seat valve of claim 2, characterized in that the first closer (8) has a beaker-shaped cup part (18), which is disposed coaxially in the collar portion (14) of the jacket part (13), and that a first end portion (22) of the sealing element (21) is sealingly clamped between an encompassing edge (20) of the jacket part (14) and an encompassing edge (19) of the cup part (18).

4. The double-seat valve of claim 3, characterized in that the encompassing edge (19) of the cup part (18) protrudes axially relative to the edge (20) of the jacket part (13), and that a first encompassing sealing face (25) of the sealing element (21) is disposed in the region of the protruding edge (20), so that the sealing face can be pressed axially by this edge against a first valve seat (11).

5. The double-seat valve of one of claim 2, characterized in that the head part (27) of the second closer (9) has an encompassing channel (33) of U-shaped profile, in which the roller diaphragm portion (24) of the sealing element (21) is received.

6. The double-seat valve of claim 5, characterized in that the housing wall facing the channel (33) is embodied as essentially smooth, so that a hollow chamber (34) exists on the valve housing (1) only when the valve is closed.

7. The double-seat valve of one of claim 2, characterized in that the collar portion (14) of the jacket part (13) of the first closer (8) changes over into a narrowed neck portion (15), which is secured to a flexible diaphragm (16) that extends substantially radially away from the neck portion (15) and both seals off the closer (8) from the valve housing (1) and assures its axial mobility.

8. The double-seat valve of claim 7, characterized in that an actuating rod (44) disposed concentrically, radially inside the first closer (8), is secured to the second closer (9) and is connected by its other end to a pneumatic actuating device (10).

9. The double-seat valve of claim 7, characterized in that the surface areas of the diaphragm (16) and the first closer (8) that are effective with respect to the pressure in the passageway region (2) are substantially equal.

10. The double-seat valve of one of claim 8, characterized in that a spring (45) is operatively disposed between the second closer (9) and the first closer (8), by which spring, when the second closer (9) is pressed against the second valve seat (12), a contact pressure is exerted on the first closer (8) against the first valve seat (11).

11. The double-seat valve of claim 10, characterized in that the spring (45) is disposed in the interior of the first closer (8).

12. The double-seat valve of claim 10, characterized in that the second closer (9) can be vented by raising the actuating rod (44), while the cup spring (45) keeps the first closer (8) pressed against the first valve seat (11).

13. The double-seat valve of one of claim 2, characterized in that the actuating device (10) has a further piston-cylinder unit, which acts on the end of the jacket part (13) of the first closer (8) located outside the diaphragm (16) and permits venting of the first valve seat (11) while the second valve seat (12) is closed.

14. The double-seat valve of claim 1, characterized in that the second closer (9) has a cap part (28), disposed coaxially on the head part (27), which has a radial extent less than that of the head part (27), and that a second end portion (23) of the sealing element (21) is sealingly clamped between an encompassing edge (29) of the head part (27) and an encompassing edge (30) of the cap part (28).

15. The double-seat valve of claim 14, characterized in that a second encompassing sealing face (26) of the sealing element (21) is disposed radially outside the cap part (28) in the region of an encompassing protrusion (31) of the head part (27), so that this sealing face can be pressed axially by the head part against a second valve seat (12).

16. The double-seat valve of claim 15, characterized in that the encompassing protrusions (31) and the second sealing face (26) are inclined relative to the valve axis (32), preferably by an angle in the range of approximately 45°.

17. The double-seat valve of claim 1, characterized in that a mutual rotation of the two closers (8, 9) is prevented by at least one axially disposed pin (42), which is rigidly secured to one closer (9) and is disposed axially slidingly in an opening (43) of the other closer (8).

18. The double-seat valve of claim 1, characterized in that two cleaning connections (35, 36), which are closable with two cleaning valves (37, 38) discharge into the hollow chamber (34).

19. The double-seat valve of claim 18, characterized in that the valve seats (39, 40) of the cleaning valves (37, 38) are disposed in the immediately vicinity of the orifices into the hollow chamber (34).

* * * * *